United States Patent [19]
Lungershausen

[11] Patent Number: 6,016,406
[45] Date of Patent: Jan. 18, 2000

[54] CAMERA FLASH UNIT INCLUDING A LENS COMPONENT WITH A TOROIDAL SURFACE

[75] Inventor: Arnold W. Lungershausen, W. Henrietta, N.Y.

[73] Assignee: Eastman Kodak Company, Rochester, N.Y.

[21] Appl. No.: 08/808,493

[22] Filed: Feb. 27, 1997

[51] Int. Cl.[7] .............................. G03B 15/03; F21V 5/00
[52] U.S. Cl. ......................... 396/200; 362/16; 362/309; 362/311; 362/335
[58] Field of Search .............................. 396/6, 155, 176, 396/200; 362/3, 6, 7, 8, 12, 16, 19, 307, 308, 309, 311, 334, 335

[56] References Cited

U.S. PATENT DOCUMENTS

| | | | |
|---|---|---|---|
| 4,937,715 | 6/1990 | O'Shea et al. | 362/335 |
| 5,021,811 | 6/1991 | Maurinus et al. | 396/6 |
| 5,160,192 | 11/1992 | Sugawara | 362/16 |
| 5,329,330 | 7/1994 | Sakai et al. | 396/6 |
| 5,615,394 | 3/1997 | Albrecht | 396/6 |

OTHER PUBLICATIONS

William B. Elmer, The Optical Design of Reflectors, (Geometric Foundations of Reflector Design) pp. 42–48 & Chapter 10 pp. 142–186 Third Edition.

*Primary Examiner*—Safet Metjahic
*Assistant Examiner*—Michael Dalakis
*Attorney, Agent, or Firm*—Svetlana Z. Short

[57] ABSTRACT

A reflector includes one closed end, one open end and highly reflecting curving walls. The walls are symmetrical about at least one axis of symmetry. The walls include a first segment and other segments. Briefly described, according to one aspect of the present invention, a camera flash unit for illumination of an associated target area has a light source providing light defined as light rays, a reflector directing the light rays from the light source towards the associated target surface and a refractive lens component. The reflector includes one closed end, one open end and highly reflecting curving walls. The walls are symmetrical about at least one axis of symmetry. The refractive lens component is located at the open end of the reflector. It has two surfaces—a back side surface facing said light source and a front side surface. One of the surfaces has a cylindrical shape, the other of the two surfaces has a toroidal shape.

15 Claims, 13 Drawing Sheets

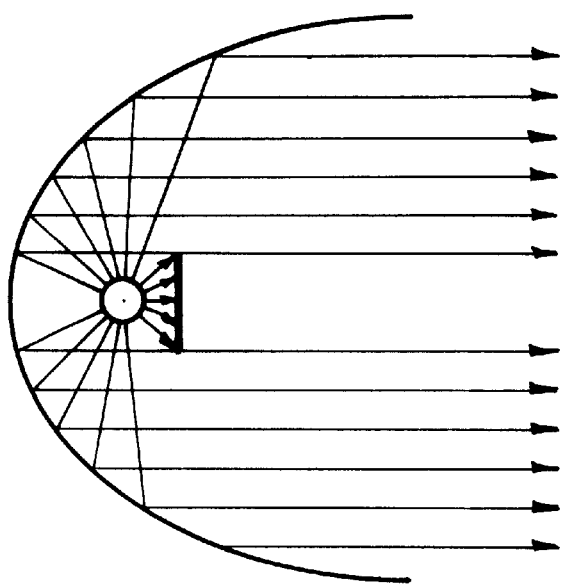
FIG. IA
(prior art)
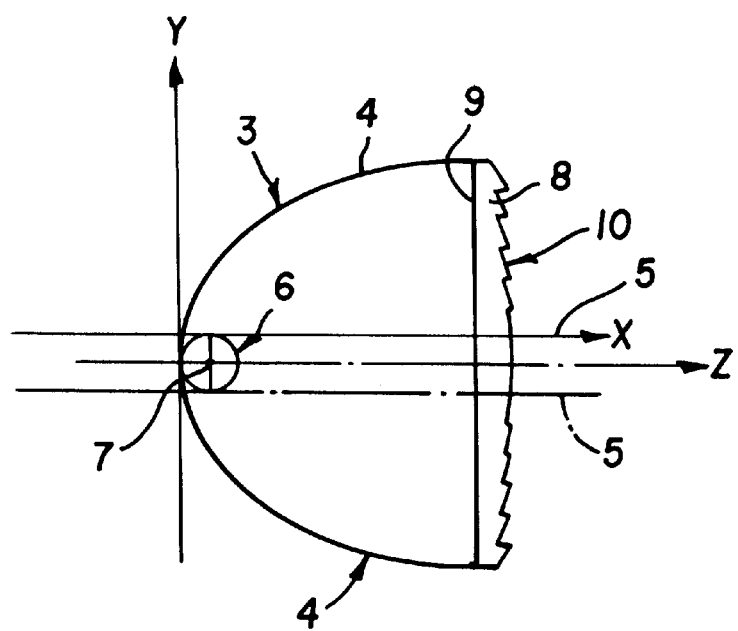
FIG. IB
(prior art)

CAMERA FLASH UNIT INCLUDING A LENS COMPONENT WITH A TOROIDAL SURFACE

RELATED APPLICATIONS

BACKGROUND OF THE INVENTION

1. Field of the Invention

The present invention relates to camera flash units with improved center beam and field illumination characteristics. More particularly, the present invention relates to camera flash units suitable for use in photographic devices or other camera devices requiring a substantially uniform illumination of a target surface.

2. Background

A camera flash unit needs to provide a good, relatively uniform illumination of a target surface and to avoid a lamp interference problem. Lamp interference results when the light rays reflected off the flash unit's reflective inner walls pass through the light source or its transparent envelope. This problem is described in the book entitled "The Optical Design of Reflectors" by William B. Elmer, Third Edition, Copyright 1989, by TLA Lightning Consultants, Inc. Salem, Mass., pgs. 178–179.

In theory, a flash unit with a parabolic reflector would provide a collimated light beam to uniformly illuminate a target surface located near the reflector opening, but only if the light source was a point light source located at the reflector's focal point, and only if the reflected light (but no direct light from the light source) reached the target surface. If a lamp of finite size was used as a light source, then the direct light from this lamp would have to be blocked (as shown in FIG. 1A), and a shadow would be cast in the center of a target plane.

Other flash units have been designed to provide a relatively uniform illumination. U.S. Pat. No. 5,160,192 discloses a flash unit (see FIG. 1B) that includes a reflector 3 composed of a combination of two elliptical shells 4. The optical axes of the shells 4 are separated from one another. An elongated cylindrical light source 6 is located between the shells 4 and has a longitudinal axis 7 parallel to the optical axes of the elliptical shells 4. A Fresnel condenser lens 8 is located at the opening of the reflector 3.

In some of the embodiments the back surface 9 of the condenser lens (i.e., the surface facing the light source 6) is piano and the front surface 10 has a convex, cylindrical shape. Because surface 10 has optical power in one plane only (generally designated the "Y-Z" plane), the condenser lens can control target surface illumination in only that plane.

In other embodiments, the back surface 9 of the condenser lens 8 has a cylindrical shape and the front surface 10 is a concentric Fresnel surface. Thus, the surface 10 is circularly symmetric. The surface 10 of the condenser lens condenses the target surface illumination equally in all directions. The use of the surface 9 can improve illumination profile in one direction, for instance, the horizontal or vertical direction, but the corresponding orthogonal direction is unaffected. Because camera flash light sources are typically elongated, the use of spherical and cylindrical power, separately or in combination, is a compromise attempt to control the illumination distribution in independent, or topologically orthogonal, directions. It is desirable to provide independent illumination of the target surface in two directions.

SUMMARY OF THE INVENTION

It is the principal object of the present invention to provide an alternative camera flash unit that achieves similar or better target illumination distribution than the distribution provided by the prior art and that does not suffer from a lamp interference problem.

Briefly described, according to one aspect of the present invention, a camera flash unit for illumination of an associated target surface comprises a light source providing light defined as light rays, a reflector directing the light rays from the light source towards the associated target surface and a refractive lens component. The reflector includes one closed end, one open end and highly reflecting curving inner surface walls. The inner surface walls are symmetrical about at least one axis of symmetry. The refractive lens component is located at the open end of the reflector. It has two surfaces—a back side surface facing said light source and a front side surface. One of said surfaces is a cylindrical surface, the other of said two surfaces is a toroidal surface.

According to a preferred embodiment of the present invention the light source is a flash lamp.

One advantage of the flash-unit of the present invention is better enter beam intensity distribution and better field illumination characteristics.

Another advantage of the present invention is that it provides independent illumination control on a target surface in two orthogonal directions.

BRIEF DESCRIPTION OF THE DRAWINGS

The foregoing and other objects, features and advantages as well as the presently preferred embodiment thereof will become more apparent from reading of the following description in connection with the accompanying drawings.

FIG. 1A illustrates a prior art reflector.

FIG. 1B shows a prior art camera flash unit.

FIG. 6A depicts the Y-Z plane. FIG. 6B depicts the X-Z plane

DESCRIPTION OF THE PREFERRED EMBODIMENT

Figure 2A:
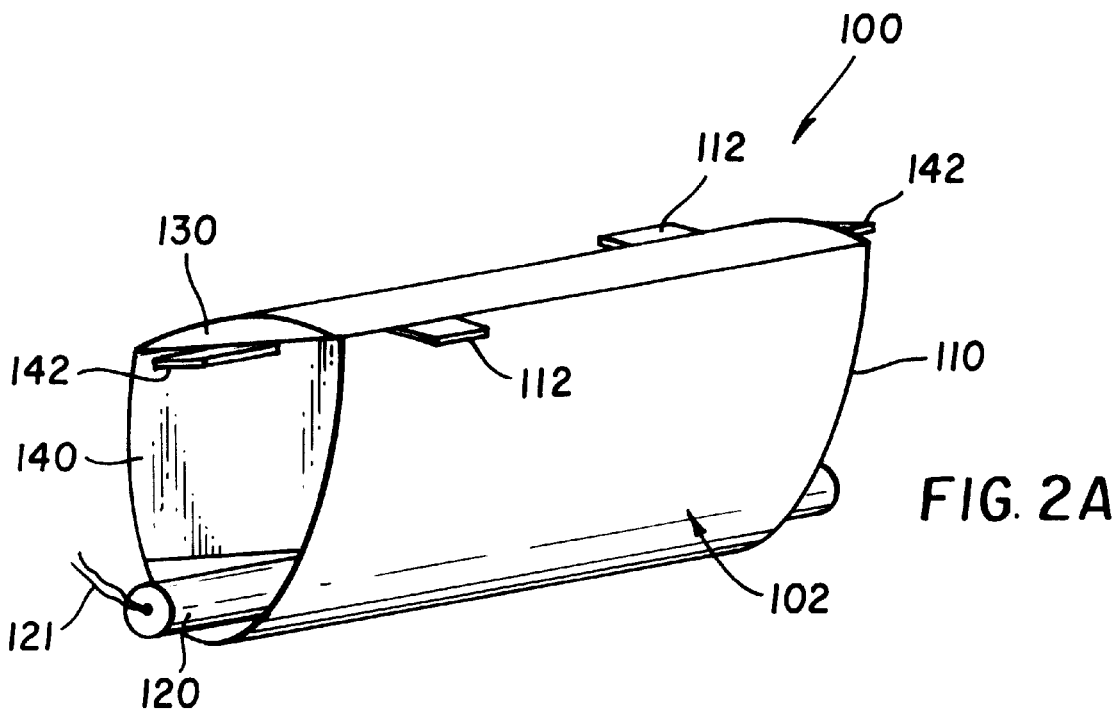
FIG. 2A is a top perspective view of the camera flash unit of a preferred embodiment of the present invention.
Figure 2B:
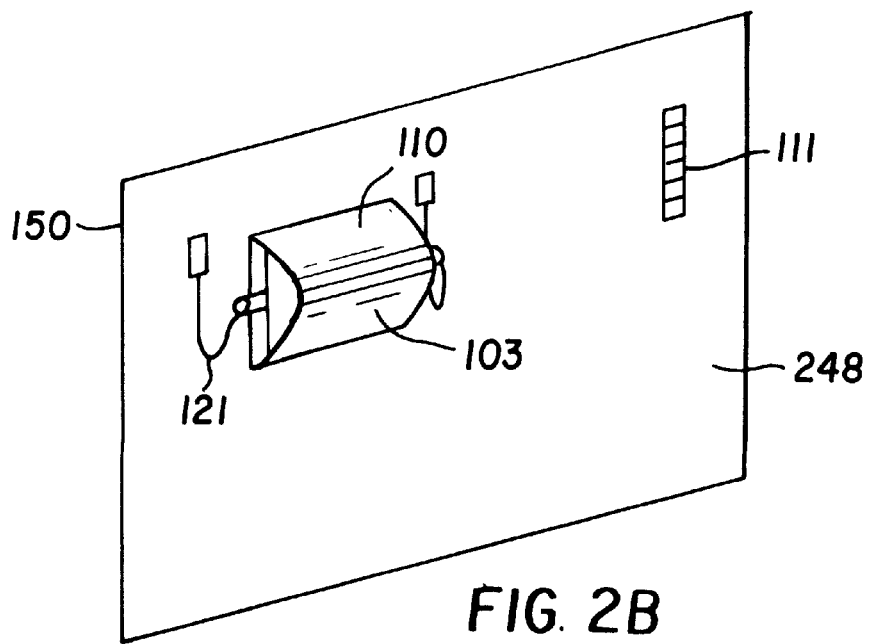
FIG. 2B is a rear perspective view of the camera flash unit of FIG. 2A mounted in a circuit board.

FIGS. 2A and 2B show perspective views of the camera flash unit 100. This camera flash unit includes a reflector 102 with one closed end 103, one open end 104 and curving walls 110 with a highly reflective curving inner surface walls 110A. It also includes a flash lamp 120 and a condenser lens 130. In a preferred embodiment of the invention, the reflector is trough shaped, and the walls 110 are roughly cylindrical as shown in FIGS. 2A and 2B. The camera flash unit 100 also has side walls 140 that have a reflective inner surface walls 140A which redirect the intercepted light (coming directly from the flash lamp 120 as well as reflected by the highly reflective inner surface 110A) towards the target surface. The walls 110 and 140 may have one or more tabs 112, 142 for mounting the camera flash unit on a wall 150 such as a flash board (or a circuit board 248), for example. The camera flash unit may also include other conventional features associated with known flash devices.

Figure 3:
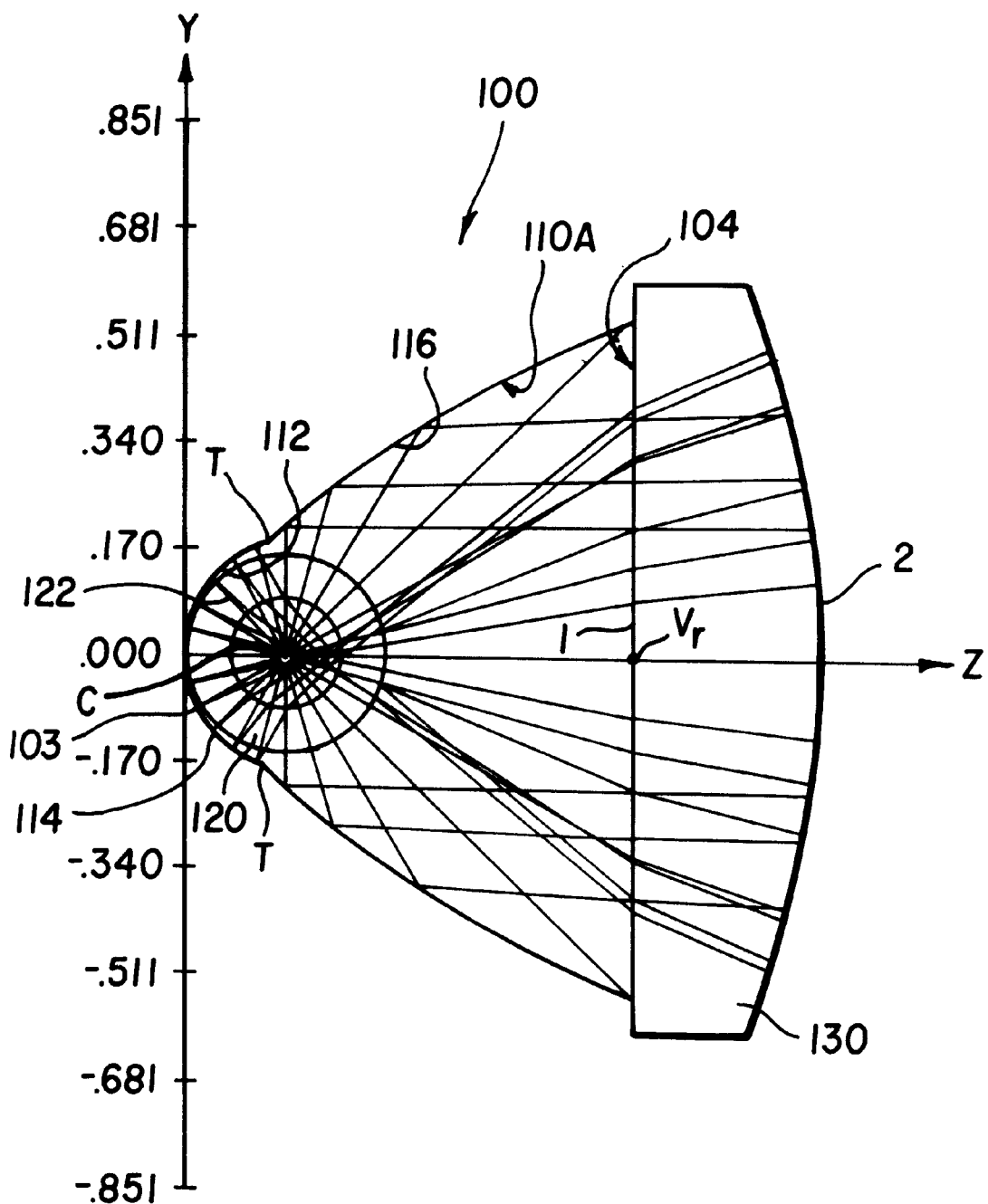
FIG. 3 is a diagrammatical cross sectional view of the camera flash unit of FIG. 2A. For clarity, the curving walls are illustrated as having a nominal thickness.

FIG. 3 shows a cross sectional view of the curved reflective inner surface walls 110A, of the flash lamp 120 and of the condenser lens 130 of the camera flash unit 100. The condenser lens 130 is a single refractive lens component. Its back side surface (surface 1) is cylindrical and provides optical power only in X-Z plane. Its front side surface (surface 2) is not a rotationally symmetrical surface. It is a toroidal surface, and it provides different amount of optical power in X-Z and Y-Z planes. Because the front surface of the condenser lens 130 is toroidal, the condenser lens can independently control the illumination in at least two directions transverse to the optical axis of the condenser lens. Because both the surface 1 and the surface 2 provide optical power in the X-Z plane a better illumination control is possible, resulting in a good light distribution at target surface located 6–8 feet away from the open end 104 of the reflector 102. The specific parameters for the condenser lens 130 are provided in Table 1.

TABLE 1

| Surface | X Radius | Y Radius | Thickness | Index |
|---------|----------|----------|-----------|-------|
| 1 | 60 mm |  | 3 mm | 1.58 |
| 2 | −80 mm | −16 mm |  |  |

It is contemplated that in other embodiments either the cylindrical or/and the toroidal surface may be defined by a conic constant and/or have higher order aspheric coefficients. This would further facilitate illumination control. In some of the embodiments a toroidal surface may be substituted in place of the cylindrical surface.

The reflective inner surface walls 110A of the walls 110 include a first segment 114 and at least one other segment 116. This is also shown in FIG. 3. The first segment 114 has a curved shape and is located at the closed end 103 of the reflector 102. The other, second segment 116 is also curved. The reflective inner surface walls 110A have at least one transition zone T between the first segment 114 and an adjacent one of the other segments 116.

As can be seen from FIG. 3, the first segment's shape closely tracks the shape of the flash lamp 120. This arrangement allows the reflected light rays 122 to be directed toward the center C of the flash lamp and mitigates shadowing effects caused by the flash lamp. The center C of the flash lamp 120 is located about 5.5 millimeters away from the rear vertex $V_r$ of the condenser lens 130.

Figure 4:
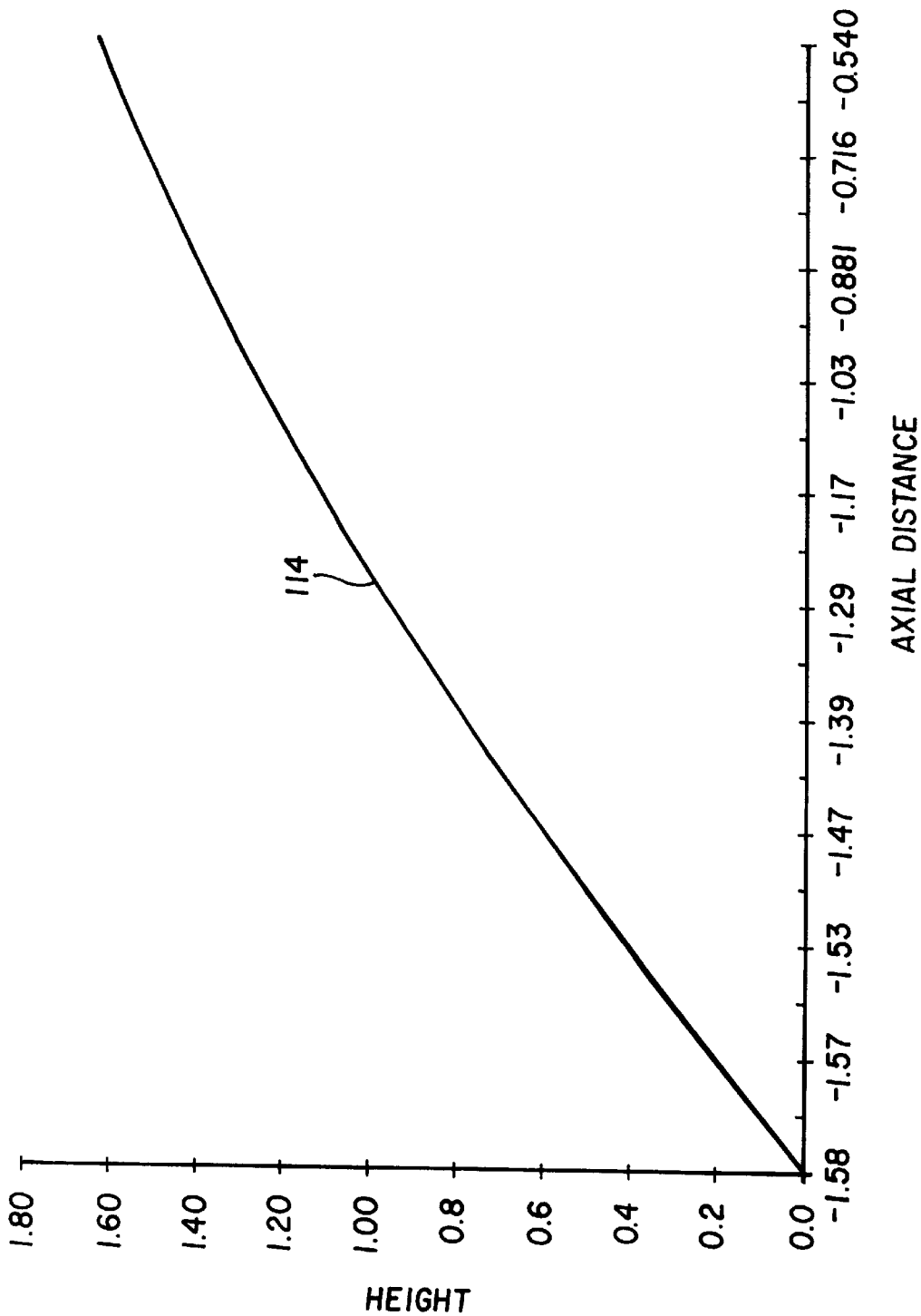
FIG. 4 is an enlarged diagrammatical view of a first segment of the (upper) curving walls.
Figure 5:
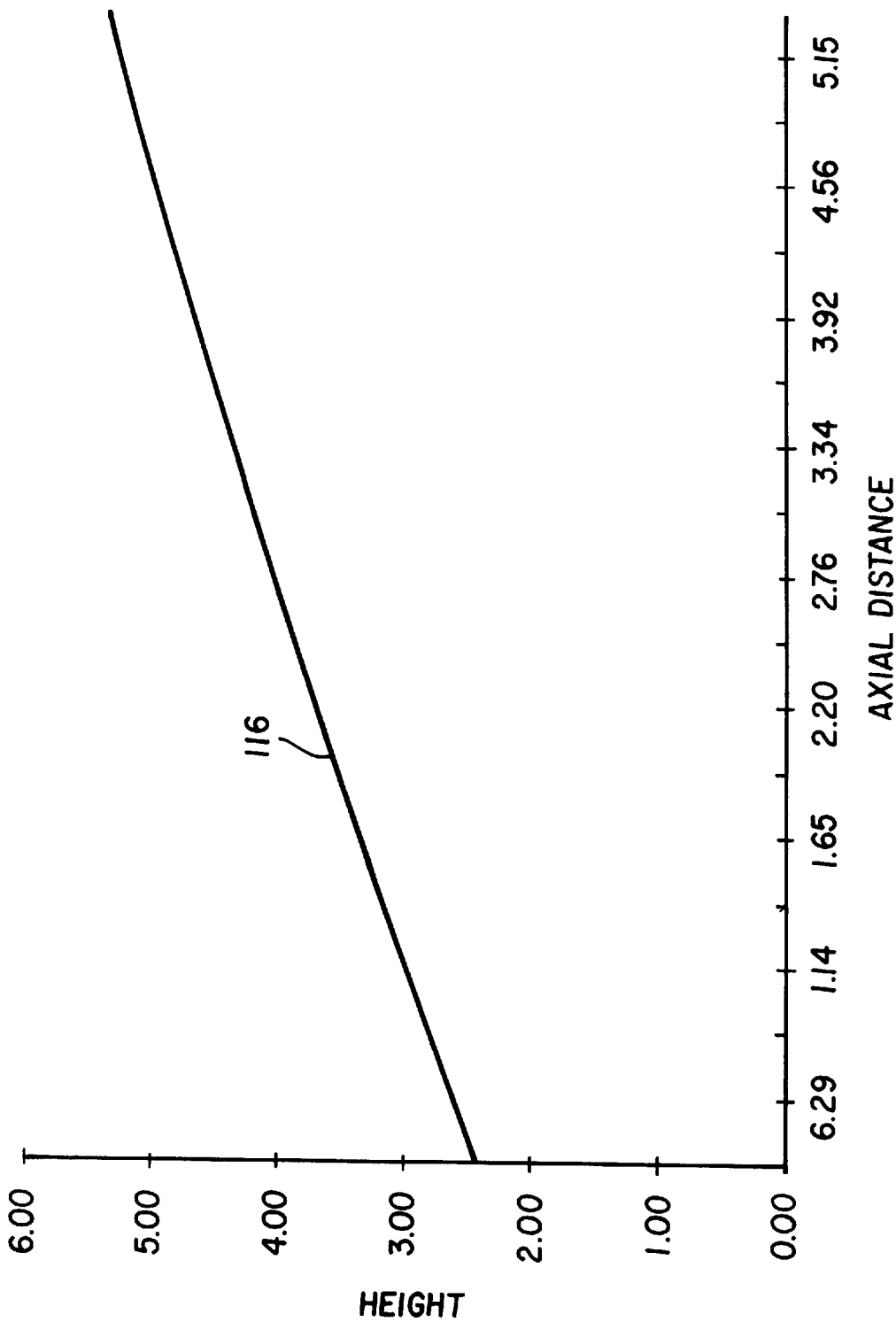
FIG. 5 is an enlarged diagrammatical view of a second segment of the (upper) curving walls.

A much enlarged part of the section of the first segment 114 is depicted in FIG. 4. A much enlarged part of a section of the outer surface segment 116 is depicted in FIG. 5. In these two figures the center C of the flash lamp 120 defines the X=0.0, Y=0.0 point. All the measurements are in millimeters.

The shape of the first segment 114 is described by the following equation:

$$y = -0.0001z^2 + 0.0115z - 0.0127;\text{ and}$$

where y is a vertical distance and z is the distance along the optical axis.

The shape of the second (outer) segment 116 is described by the following equation:

$$y = -0.00002z^2 + 0.0064z + 0.02372;\text{ and}$$

where y is the vertical distance and z is the distance along the optical axis.

It is contemplated that some other reflector shapes may also be used.

According to the preferred embodiment, the flash lamp 120 delivers approximately of 5.5 joules of radiant energy per flash. This radiant energy is visible, near UV (ultra violet) and near IR (infra-red) light. The example illustrated in FIGS. 2A, 2B and 3 utilizes a one centimeter long xenon tube flash lamp.

Figure 6A:
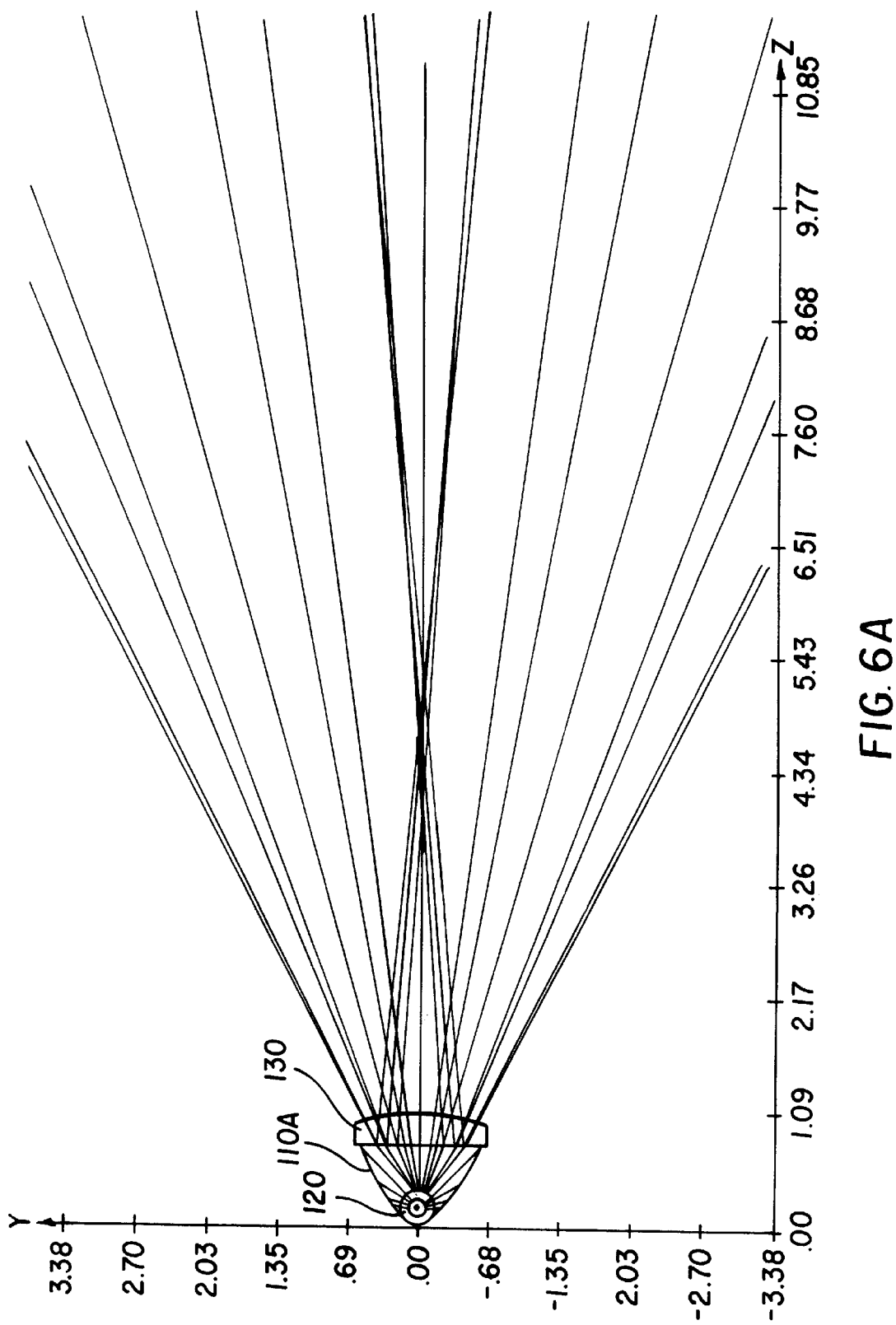
FIGS. 6A and 6B are slots of the light rays reflected by the reflective inner surface walls of the camera flash unit.
Figure 6B:
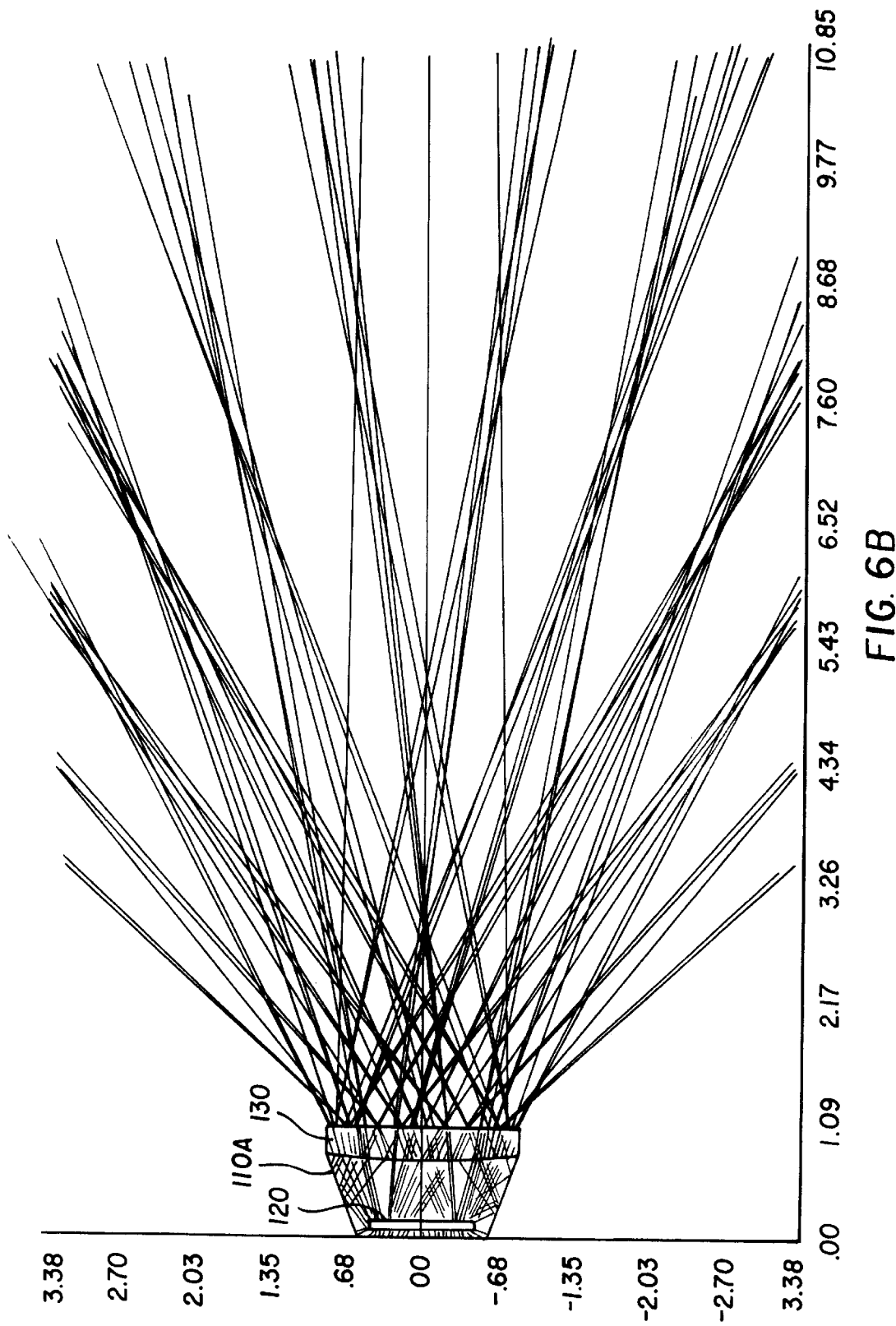

FIGS. 6A and 6B illustrate the behavior of the light rays emanating from the camera flash unit 100. More specifically, FIG. 6A shows in the Y-Z plane (side view) the light rays traveling from the flash lamp towards the reflective inner surface walls, reflecting of these walls and propagating through the condenser lens 130. FIG. 6B shows in the X-Z plane (top view) the light rays traveling from the flash lamp towards the reflective curving walls, reflecting of these walls and propagating through the condenser lens 130. In these figures, the vertex point of the closed end of the reflector defines the X=0.0, Y=0.0 point. All the linear measurements are in centimeters.

Figure 7A:
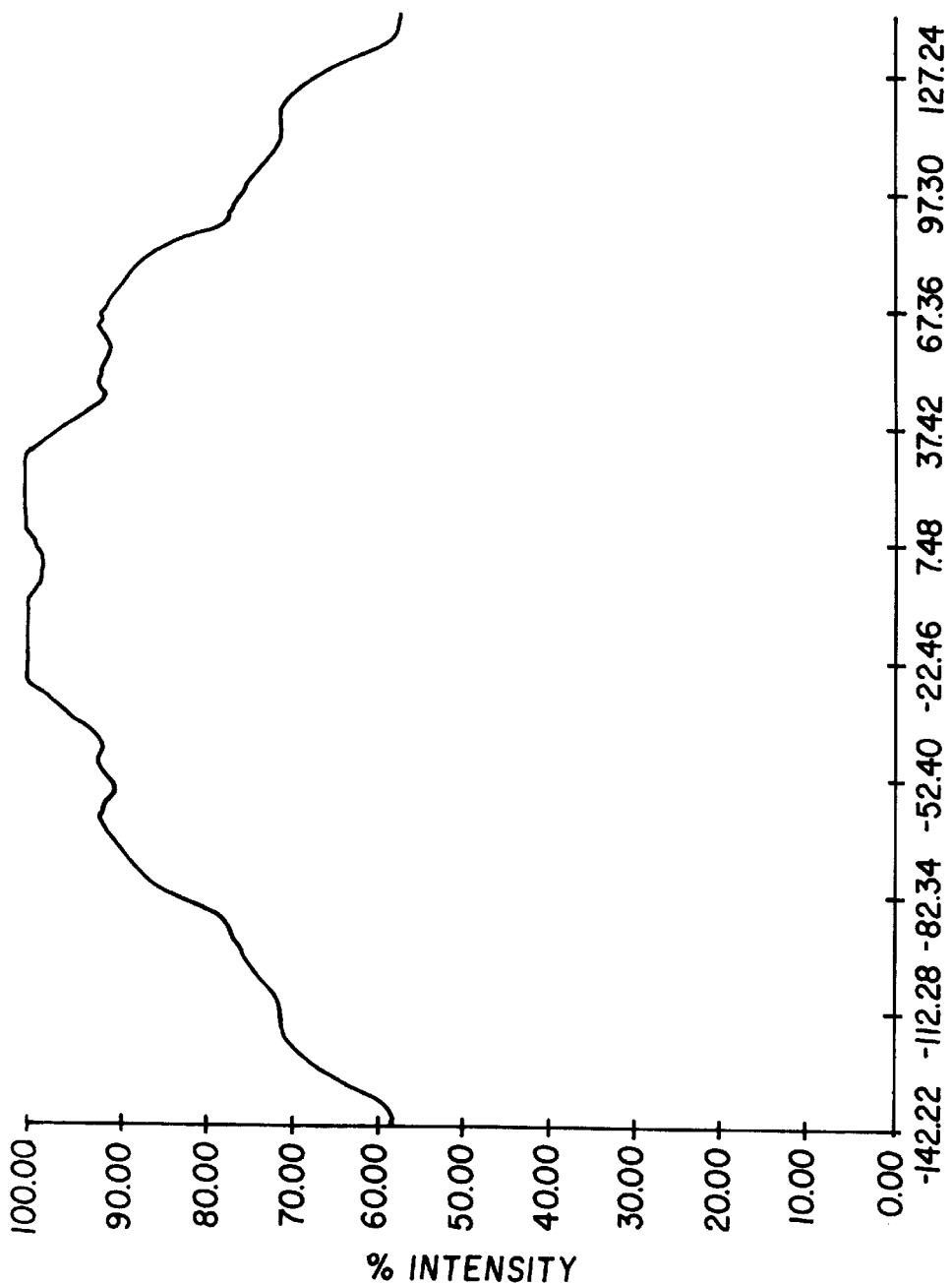
FIGS. 7A–7B are plots of the intensity distribution along a center vertical line and a center horizontal line, respectively, at the target surface. The target surface is parallel to the X-Y plane (where X is the horizontal direction and Y is the vertical direction) of the flash unit and is at a separation of 2 to 3 feet from the flash unit.
Figure 7B:
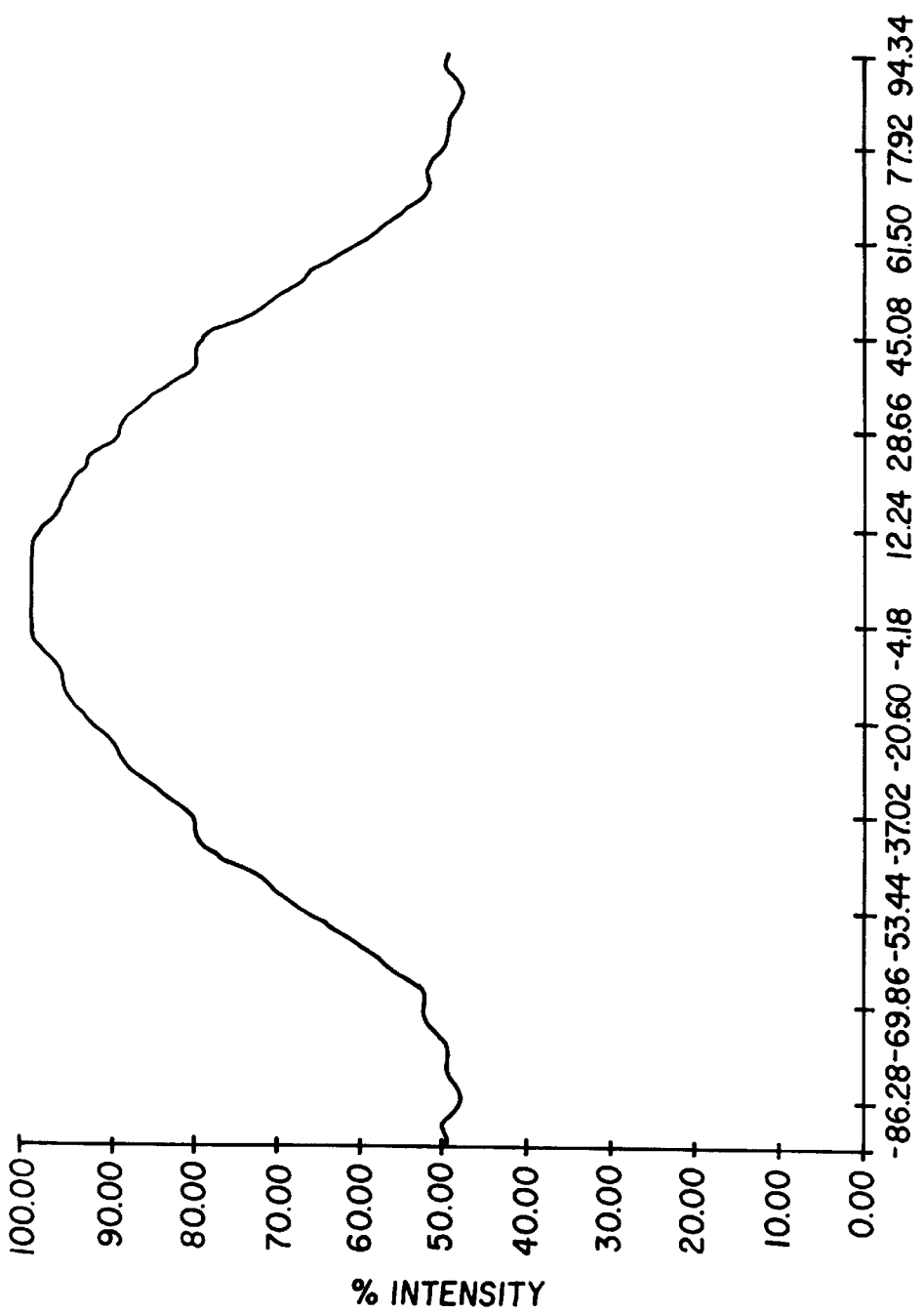

The camera flash unit of the preferred embodiment described herein achieves a substantially uniform illumination on the target surface 25 of approximately 9'×6' (width and height) located 6 to 8 feet away from the open end 103 of the reflector 102. FIG. 7A is a plot of the intensity distribution in the Y-X plane along the center vertical line, while FIG. 7B is a plot of the intensity distribution in the Y-X plane along the center horizontal. This intensity distribution is normalized, with the intensity having a value of 100 at the center of the target surface 25.

The previously described camera flash unit 100 having the above-described condenser lens 130 is operationally connected to a capacitor 246, is mounted on the circuit board 248 and is powered by a battery 250. The circuit board includes circuit elements necessary to develop a change and to activate the flash lamp. The circuit board can include flash synchronization contacts for releasing the energy required by the flash lamp.

Figure 8:
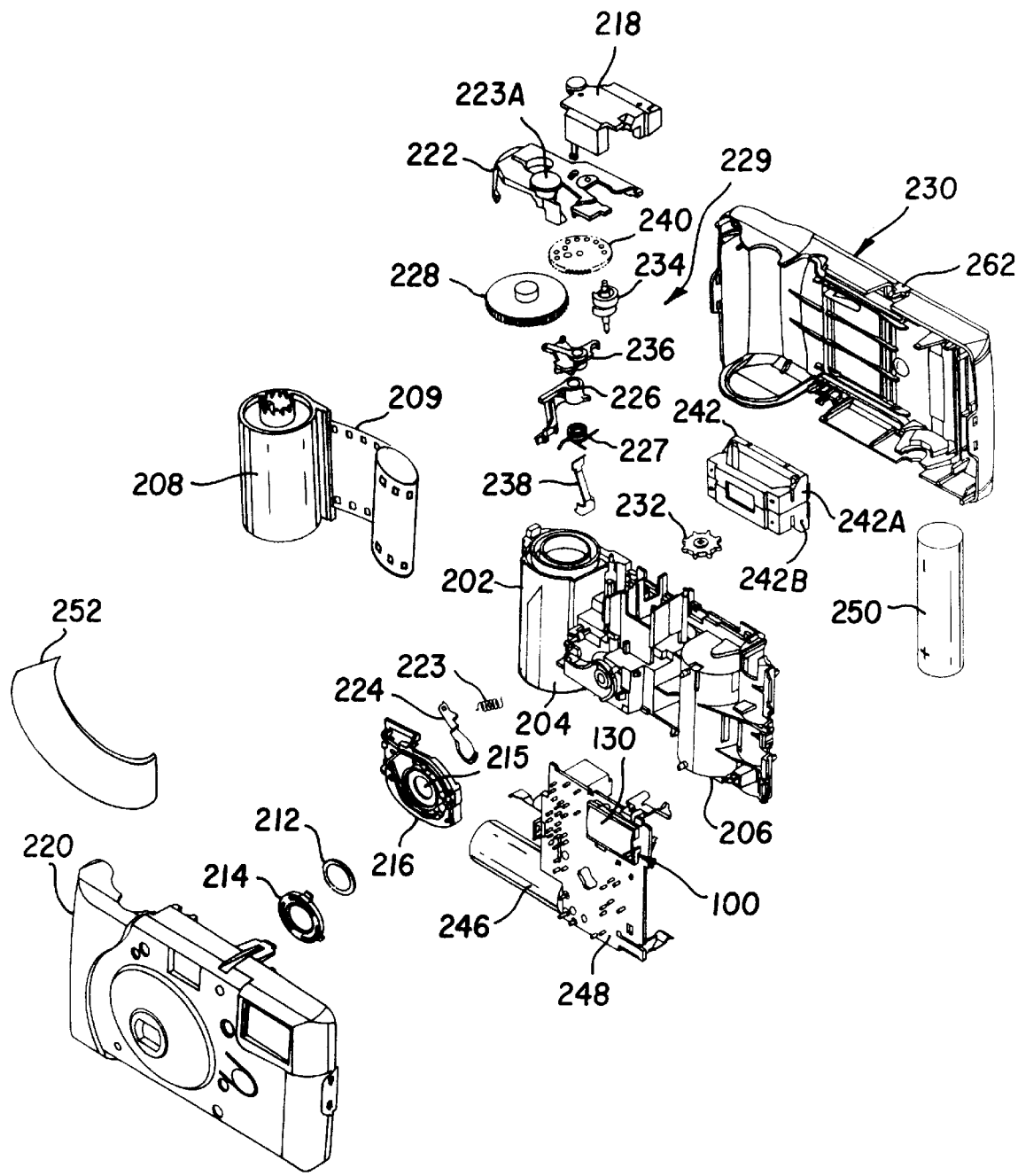
FIG. 8 illustrates an exploded view of a camera incorporating a camera flash unit of FIG. 2A.

Referring now to FIG. 8, the camera flash unit 100 can be contained within the assemblage of a camera, such as a recyclable single use camera 200 having a body assembly with three major structural components; a body or frame 202, a front cover 220 which is attached to the front of the body 202, and a rear cover 230 which is attached to the rear of the body 202.

Figure 9:
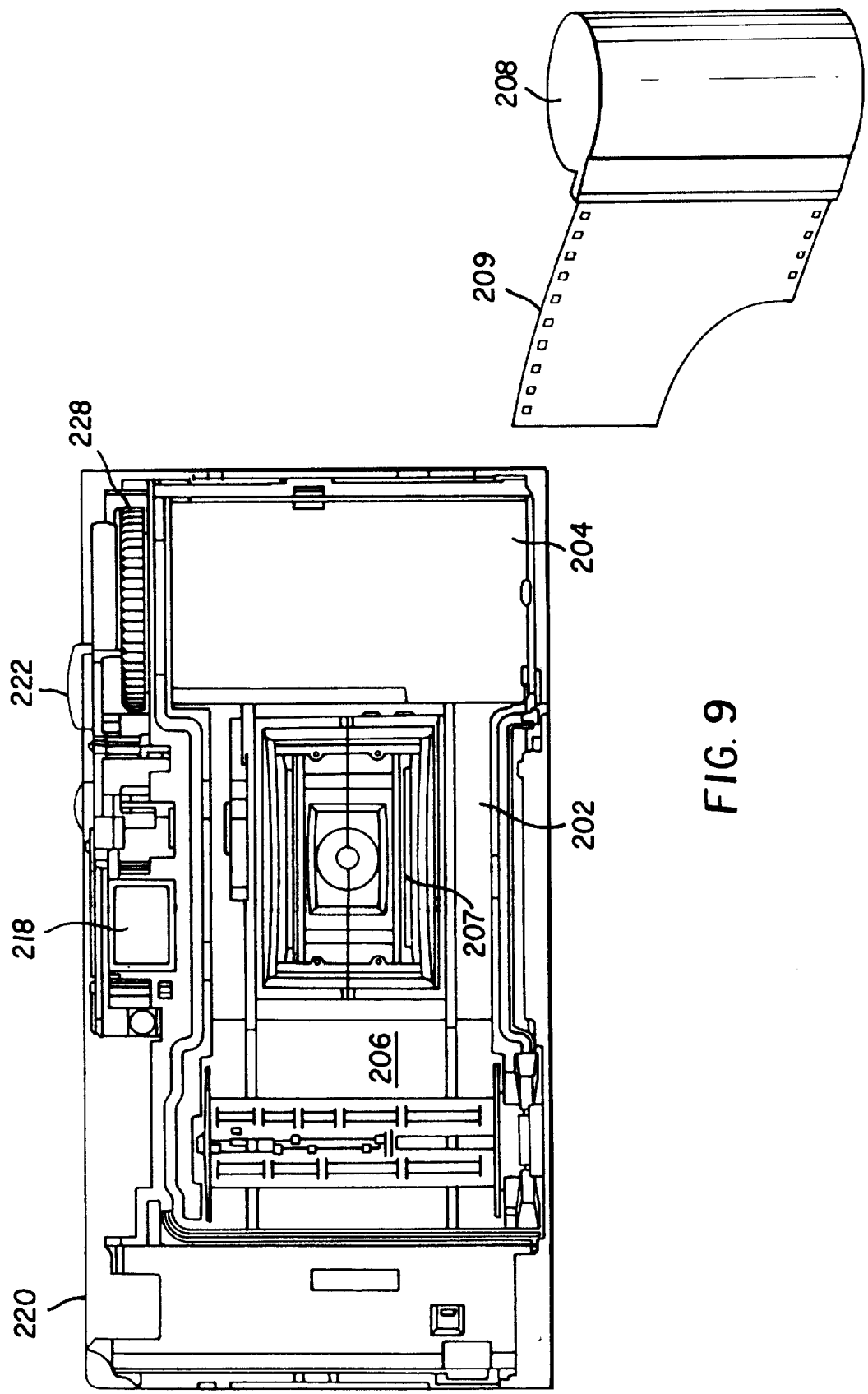
FIG. 9A is a rear plane view of the camera of FIG. 8 with the rear cover removed.
FIG. 9B is a perspective view of a film cassette suitable for use in the camera of FIG. 9A.

Referring more specifically to the exploded view of the camera 200 shown in FIG. 8, the body 202 includes a pair of film chambers 204, 206 (i.e., a cartridge chamber 204 and a film chamber 206) for retaining a film cassette 208 and a roll of unexposed film, respectively. An exposure gate 207 is disposed between the film chambers 204, 206. The body 202 (see FIG. 9) additionally supports the following camera parts which are attached to the body prior to the attachment of the covers 220, 230: a taking lens 212 which is attached to the front of the body 202 by means of a two piece holder 214, 216 and a viewfinder 218. Also attached to the body 202 is a shutter mechanism 219 consisting of a release 222 having a depressible button 223A for tripping a shutter blade 224. The shutter blade 224 is held in place over an aperture 215 by a holder 216. The shutter blade 224 is movable between an open position and a closed position and is biased toward the closed position by a helical spring 223. A high energy lever 226 is mounted in the body between the release 222 and the shutter blade 224. The high energy movable lever 226 is movable from a release position to a set position by a film advancing and metering mechanism 279. The high energy lever 226 is biased toward the released position by a spring 227. The high energy lever 226 is held in the set position by a film advancing and metering mechanism 229 until a shutter release button 223A is pressed, at which time the high energy lever 226 is driven by the spring 227 against the shutter blade moving the shutter blade from the closed position to the open position. The high energy lever 226 then moves past the shutter blade and the shutter blade returns to the closed position under the action of the spring 223. The high energy lever is reset for the next film exposure by the film advancing and metering mechanism.

The film advancing and metering mechanism 229 includes mechanically coupled components which advance and meter the film. A thumbwheel 228 engages the spool (not shown) of the loaded film cassette 208. A sprocket 232 engages film perforations and has a spring biased portion extending into a rotatable cam 234 which engages a metering lever 236, biased by means of a spring 238, so as enable frame by frame film advance. The cam 234 has an extending portion that drives a frame counter 240.

The body assembly 201 also includes a light baffle 242, (made of an upper baffle part 242A and lower baffle part 242B) which are mounted into the rear of the body 202 interior to exposure gate 207 (FIG. 9), or alternatively are integrally formed with the body 202.

The front cover 220 and the rear cover 230 are sandwiched and held together along with the body 202 by hooks and matching slots, or tabs, or heat or solvent welding or the like, to form an assembled camera. One or more decorative labels 252 may be subsequently attached to the finished camera to provide a convenient place for product identification and operational information. The label or labels may take a form of a sticker or a folded cardboard element.

For a variety of reasons, including economic efficiency and environmental concerns, single use cameras, such as the described camera 200, are designed to be recycled by the manufacturer after a purchaser has completed exposing the loaded film and turned the camera over to a photofinisher for development of the film. See, for instance, U.S. Pat. No. 5,329,330 to Sakai, et al. Therefore, certain parts of the cameras are designed to last through a suitable number of cycles of sale, use, reconstruction, and resale. Conversely, for quality reasons, among others, certain parts should be replaced each time a camera is reconstructed. To successfully recycle cameras, it is important to know when particular reused camera parts should no longer be utilized because, for example, they have reached the end of their useful life. Thus, each time a camera is recycled, as described in detail below, a mark on the camera body and/or flash mechanism may be made in accordance with commonly owned U.S. Pat. No. 5,021,811 (the disclosure of which is incorporated by reference herein) to indicate the number of times it has been reconstructed. A mark or reuse indicator 111 may be placed on a circuit board 248 as shown in FIG. 2B to be used in indicating the number of times the board 268 has been recycled.

Figure 10:
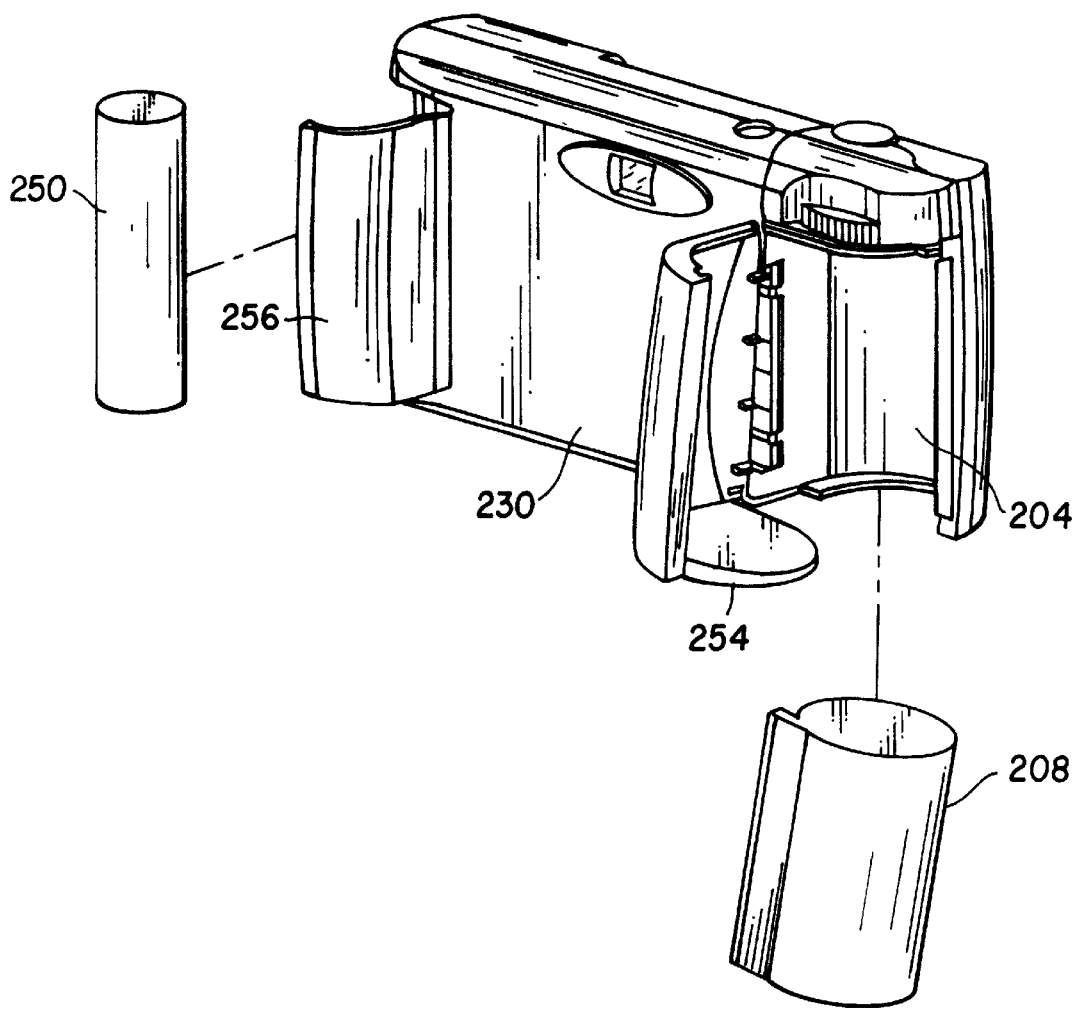
FIG. 10 is a partially exploded rear perspective view of the camera shown in FIGS. 8 and 9.

An efficient recycling program requires a number of competing concerns to be reconciled. In general, the manufacturer/recycler wants to facilitate easy access to the exposed film when removed by the photofinisher. This ensures that the reusable components are not damaged. On the other hand, access to the interior of the camera by the consumer/photographer is undesirable because it increases the risk of damage to and/or contamination of the interior of the camera and its reusable components. These considerations are resolved by the particular design of the door 254 provided on the rear cover as shown in FIG. 10, to access the film chamber 204. To facilitate recycling without damage to the camera, the door 254 may be attached to the camera body 202. The opening of the door 254 provides access to film cassette 208 without damaging or exposing the camera parts attached to the camera body 202. A second door 256 can also be provided on the rear cover on the front cover to be flexibly opened or broken away by the photofinisher to remove the flash battery 250, if desired. See FIG. 10.

Figure 11:
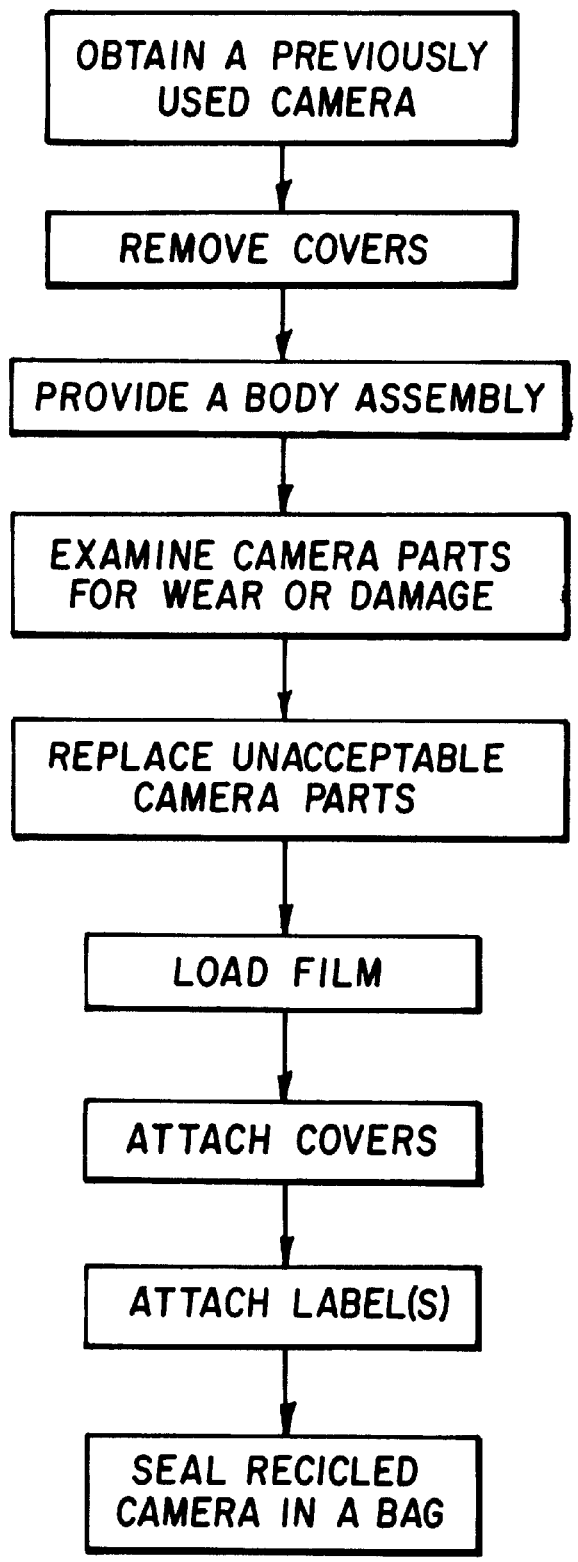
FIG. 11 illustrates a method of making a single use camera from previously used camera parts.

The camera 200 is then turned over to the manufacturer for recycling as will now be described with reference to FIG. 11. The recycling process may comprise the following steps: The front cover 220 and rear cover 230 may be detached from the camera body 202. It should be readily apparent that the covers 220, 230 and body 202 may utilize a number of means for attaching the structural parts together; for example, hook and/or press fitting members may be used, or the parts can be ultrasonically welded together. Thus, each cover may have a suitable number of conventional releasable hook structures (one of which is shown at 261, 262) or other attachment means for allowing removal of the covers from the body. The covers may be made from a recyclable plastic such as polystyrene and can be sent to be pulverized. The pulverized material may be blended with virgin materials and new covers or other parts molded therefrom.

The taking lens 212 is also removed. The taking lens may be similarly pulverized with other lenses, blended with virgin materials, and new lenses made therefrom.

Other parts, typically more costly components designed to be reused, such as the main body 202 and the major parts supported by the body, e.g., the viewfinder 218, shutter mechanism 219, film advancing and metering mechanism, and a camera flash unit 100, including the condenser lens 130, etc. may be examined carefully for wear or damage.

Those parts deemed damaged or worn may be removed from the body 202 and replaced with new parts. Those remaining reusable parts, such as the camera flash unit 100, shutter mechanism 219, etc., that can be reused, remain supported by the camera body, for construction into a camera.

A new front cover 220 is then fitted to the front face of the body 202 and an unexposed roll of film 209 contained within a fresh film cassette 208 is loaded into the film cartridge chamber 204. A new rear cover 230 is then attached to the camera body.

The film 109 is then prewound so that the film is wound back into the cassette 108 as the film is being exposed.

At least one wind and trip check (film advance and shutter actuation) may be done to simulate taking a picture, thereby bringing the counter down to 24 (assuming a 24 exposure roll). The camera then may be inserted into a cardboard casing or a label such as 252 may be attached thereto by adhesive. The recycled camera 200 then may be sealed in a foil wrap, plastic bag or the like, for protection against environmental extremes such as excessive humidity, and packaged in an outer cardboard box for sale. The recycled single use camera, utilizing previously used single use camera parts, such as a camera flash unit 100 is now fully assembled and ready for consumer use.

The foregoing description of the invention is merely exemplary and minor changes and modifications to the invention as described are possible and wholly within the scope of the invention as set forth in the appended claims.

The invention has been described in detail with particular reference to the preferred embodiment, but it will be understood that variations and modifications can be effected within the spirit and scope of the invention.

What is claimed is:

1. A camera flash unit for illumination of an associated target surface comprising:
   (i) a light source providing light defined as light rays;
   (ii) a reflector directing the light rays from said light source towards the associated target surface, said reflector including one closed end, one open end, and highly reflective, curving inner walls, said inner surface walls being symmetrical about at least one axis of symmetry; and
   (iii) a refractive lens component located at said open end, said refractive component having two surfaces—a back side surface facing said light source and covering said opening and a front side surface, both of said surfaces intercepting and being centered on aid line of symmetry, one of said surfaces being a cylindrical surface, the other of said two surfaces being a toroidal surface and adapted to direct non collimated, fanned light rays toward the target surface.

2. A camera flash unit according to claim 1, wherein said light source is a flash lamp.

3. A camera flash unit according to claim 2, wherein said surface with a toroidal shape is the surface facing said light source.

4. A camera flash unit according to claim 3 wherein said lens component satisfies the following parameters

TABLE 1

| Surface | X Radius | Y Radius | Thickness | Index |
|---------|----------|----------|-----------|-------|
| 1 | 60 mm |  | 3 mm | 1.58 |
| 2 | −80 mm | −16 mm |  |  |

5. A camera flash unit according to claim 1, wherein said highly reflective curving inner walls include (i) a first segment forming said closed end, said first segment having a shape which closely tracks the shape of said flash lamp in at least one cross section, and (ii) a second segment, said second segment being adjacent to said first segment and having a shape defined by a different equation than one defining the shape of said first segment.

6. A single use electronic flash camera comprising:
   a camera body having first and second film chambers,
   a flash board supported by said camera body,
   a flash unit having a reflector at one end, an opening at another end and a condenser lens covering said opening, and intercepting an optical axis of said flash unit, said condenser lens having two surfaces, one of said surfaces having a cylindrical shape, the other of the two surfaces having a toroidal shape, said condenser lens being adapted to direct non-collimated, fanned light rays toward the target surface; and
   an unexposed roll of film disposed in one of said film chambers.

7. The single use camera of claim 6, wherein said flash board has a reuse indicator.

8. The single use camera of claim 6 wherein said cylindrical shape is on an object side surface and said toroidal shape is on the surface that faces the reflector.

9. The single use camera of claim 6, wherein the camera body further comprises a film spool supported for rotation within the body, and the film is prewound on said film spool.

10. The single use camera of claim 6, wherein said camera body further supports at least one previously used single use camera part selected from the group consisting of a viewfinder, taking lens, shutter mechanism, and film advance and metering mechanism.

11. A method of making a single use camera with an electronic flash from previously used single use camera pants comprising the steps of:
   determining that a previously used camera body assembly including
      a camera body having two film chambers;
      a flash device having a reflector with a light source at one end, an opening at another end, and a condenser lens mounted in said opening and covering said opening, said condenser lens having two surfaces, one of said surfaces having a cylindrical shape, the other of the two surfaces having a toroidal shape and adapted to direct, non collimated, fanned light rays toward a target surface,
   is suitable to be reused; and
   loading an unexposed roll of film into the film cassette chamber of the camera body.

12. The method of claim 11, further comprising the step of:
   determining which, if any, of the previously used camera components must be replaced with new parts.

13. The method of claim 12, further comprising the steps of:
   supporting the camera body within a previously used front cover and rear cover; and
   attaching a paper-based material around the covers.

14. The method of claim 12, further comprising the steps of:
   (i) removing the taking lens from the previously used camera body and replacing it;
   (ii) replacing, if necessary, previously used parts selected from the group consisting of the camera body, shutter mechanism, and film advance and metering mechanism with corresponding new parts; and
   (iii) attaching, as necessary, a new front cover and a new rear cover to the camera body.

15. The method of claim 14, further composing the steps of:
   attaching a paper-based material around the front and rear covers; and
   sealing the recycled camera in a bag to preserve the unexposed roll of film loaded therein.

* * * * *